May 21, 1957 R. E. DE MORNAY 2,792,711
INSTRUMENT DRIVE
Filed Jan. 13, 1955 2 Sheets-Sheet 1
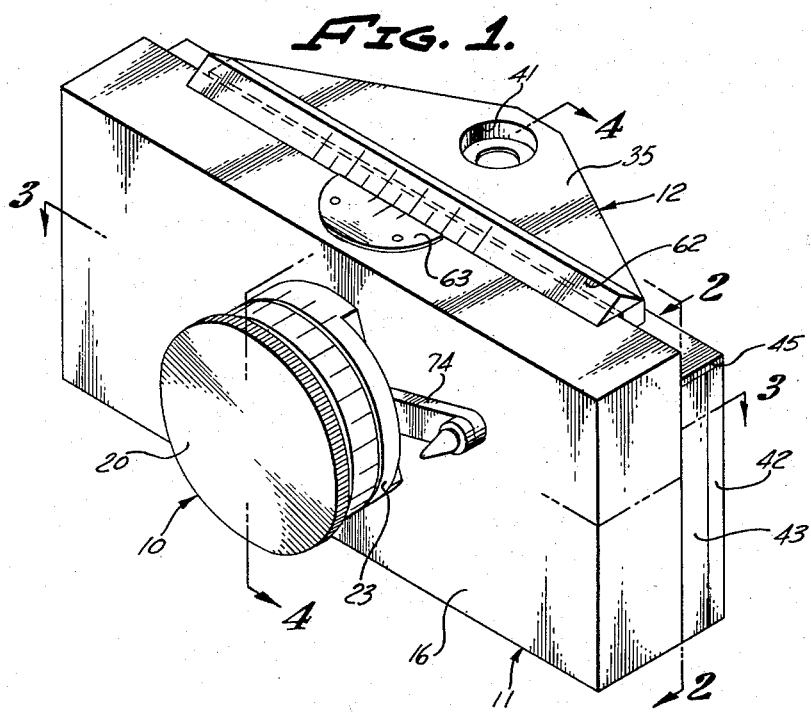
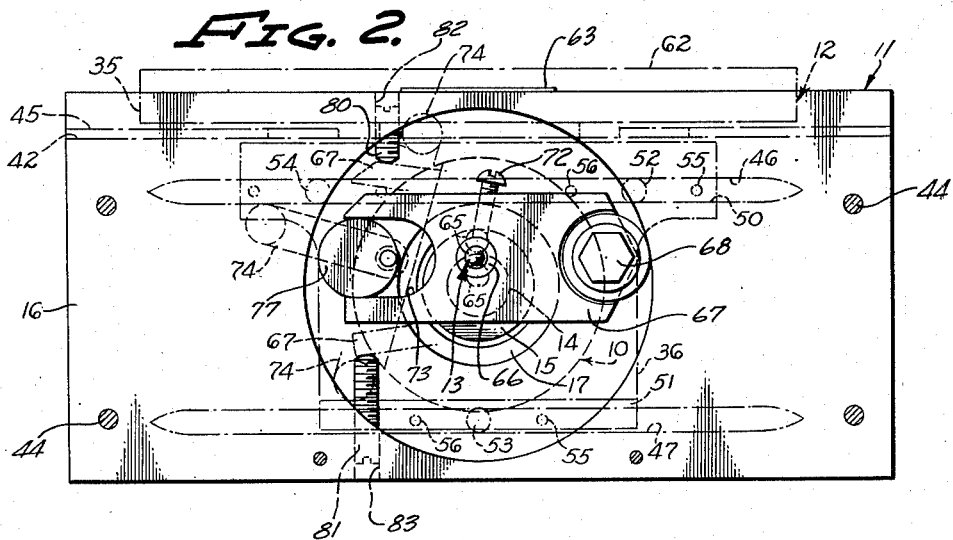
INVENTOR.
RICHARD E. DEMORNAY
BY HIS ATTORNEYS.
HARRIS, KIECH, FOSTER & HARRIS

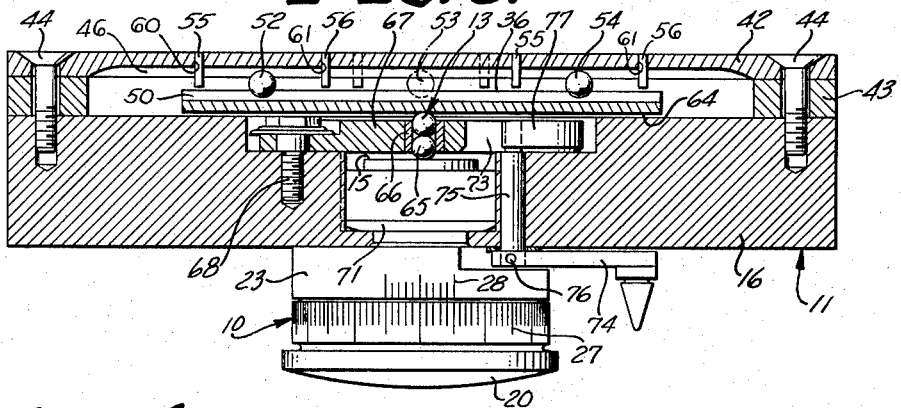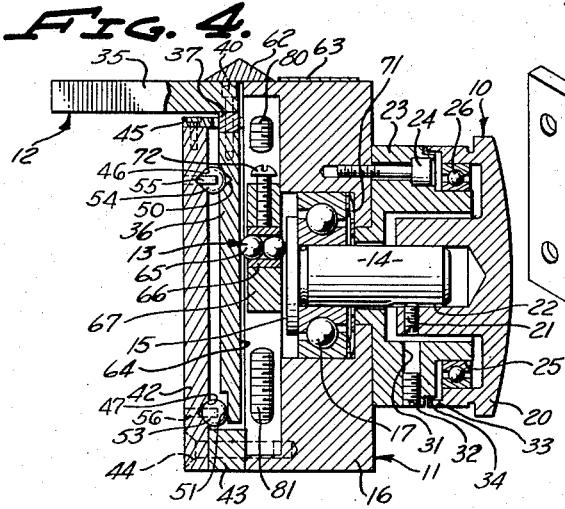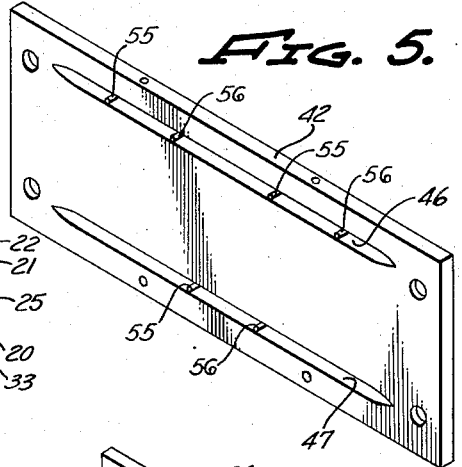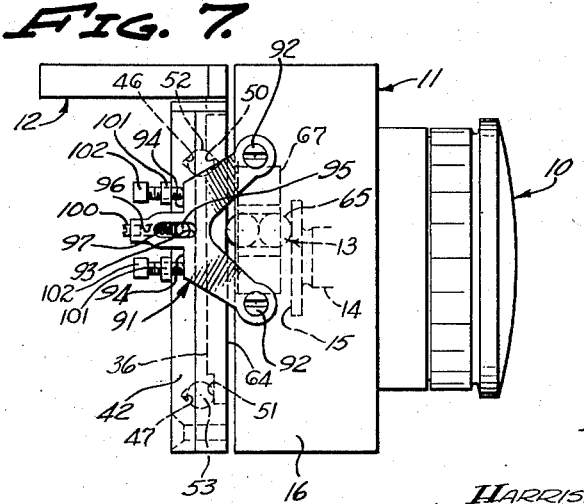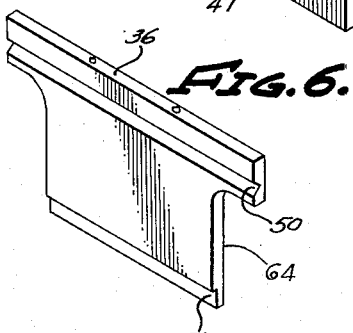

the preferred embodiments of the present invention as applied to an instrument drive, which is given by way of illustration or example only.

In the drawings:

Fig. 1 is an isometric view of an embodiment of the invention;

Fig. 2 is a sectional view of the embodiment of Fig. 1 taken along the line 2—2 of Fig. 1, with a number of the elements shown in phantom;

Fig. 3 is a sectional view taken along the line 3—3 of Fig. 1;

Fig. 4 is a sectional view taken along the line 4—4 of Fig. 1;

Fig. 5 is an isometric view of the back plate;

Fig. 6 is an isometric view of a portion of the translating driven member; and

Fig. 7 is a side elevation of another embodiment of the invention.

The instrument drive of the invention includes a drive member 10 rotatably mounted on a frame 11, and a driven member 12 translatably mounted on the frame 11. The drive member 10 and the driven member 12 are coupled by a ball means 13.

The drive member 10 includes a shaft 14 having an enlarged plate-like section at one end thereof. The plate section of the shaft 14 is provided with a flat surface 15 which is perpendicular to the axis of rotation of the shaft. The shaft 14 is rotatably mounted in a main block 16 of the frame 11 by a suitable anti-friction means, such as a ball bearing 17. The shaft 14 is driven by a knob 20 which is connected to the shaft by suitable means, such as a set screw 21 which is tightened against a flat portion 22 of the shaft. A boss 23 is attached to the main block 16 of the frame by suitable means, such as screws 24, and a bearing surface 25 is provided on the boss 23 which is concentric with the mounting surface in the frame for the bearing 17. Another bearing 26 is mounted on the bearing surface 25 and serves to support the knob 20 and to maintain the drive member in proper alignment. The knob 20 may be provided with regularly spaced index marks around its periphery 27 and corresponding marks 28 may be provided on the boss 23 to produce a vernier for precise adjustment of the knob position. A radial opening 31 is provided in the boss 23 to allow access to the set screw 21. At least the outer portion of the opening 31 is threaded and a screw 32 is inserted in the opening to keep dust and other foreign matter from entering the interior of the mechanism. A lip 33 on the knob 20 overhangs a shoulder 34 on the boss 23 to provide an L-shaped passage between the knob and the boss which also tends to prevent the entry of dust between the moving parts.

The translating driven member 12 is substantially L-shaped and as illustrated, consists of a horizontal member 35, a vertical plate 36, and a spacer 37 which are secured by suitable means, such as screws 40. An opening 41 is provided in the horizontal member 35 for mounting any instrument which the drive mechanism is to drive. A guide plate 42 is mounted on the frame main block 16 by a U-shaped spacer 43 providing an opening between the guide plate 42 and the main block 16 in which the vertical plate 36 of the driven member is positioned. The guide plate and spacer are secured to the block by suitable means such as screws 44. A dust cover 45 is attached to the top of the guide plate 42 to partially close the opening between the guide plate and the main block.

Guide means to constrain the motion of the driven member to a straight line and to reduce the friction between the vertical plate 36 and the guide plate 42 are provided to couple these two elements. This may be accomplished by providing two parallel V-shaped grooves 46, 47 in the guide plate 42 (see Fig. 5) and a corresponding V-shaped groove 50 and shoulder 51 in the vertical plate 36 (see Fig. 6). Spherical balls 52, 53, 54 are placed in the grooves between the vertical plate and the guide plate, thereby providing an anti-friction bearing and also controlling the direction of motion of the translating vertical plate. The ball 52 is retained in place by pins 55, 56 mounted in openings 60, 61 in the guide plate 42. The balls 53, 54 are held in place by identical structures.

The amount of travel of the driven member 12 may be measured by attaching a suitably graduated scale 62 to the driven member, and providing a corresponding index plate 63 on the frame.

The vertical plate 36 of the driven member 12 has a flat surface 64, and the driven member is positioned in the frame 11 so that the flat surface 64 faces the flat surface 15 of the drive member. The motion of the drive member is transmitted to the driven member by the ball means 13 which are positioned between and contact both of the flat surfaces 64 and 15. A preferred construction of the ball means is illustrated and consists of two spherical balls mounted within a bushing 66. The ratio of the movements of the drive member and the driven member is a function of the position of the balls 65 with respect to the axis of rotation of the shaft 14. In order to change this coupling ratio, means are provided to move the balls outwardly with respect to said axis. This means may consist of a pivot plate 67 rotatably mounted on the main block 16 of the frame by suitable means, such as a screw 68. The bushing 66 is pressed into an opening in the pivot plate 67 and positioned so that the contact point of the balls 65 may be aligned with the axis of rotation of the driven member by suitably pivoting the pivot plate. Firm contact is maintained between the flat surfaces 15 and 64 and the spherical balls 65, regardless of the relative positions of the aforesaid parts by means continually urging the drive member toward the driven member. Such means may consist of a washer type spring 71 placed between the ball bearing 17 and the main block 16.

Movement of the spherical balls 65 in the bushing 66 in a direction transverse to the line of contact between the balls and flat surfaces is controlled by a compressing means mounted in the pivot plate 67. The compressing means may comprise a screw 72 mounted in a tapped hole in the pivot plate and positioned so that the end of the screw bears against the outer surface of the bushing 66. Transverse motion of the balls within the bushing is reduced by supplying force on the bushing from the screw 72 and thereby compressing the bushing into contact with the balls 65. In the above described manner the transverse and axial play of the balls is controlled and all back lash may be eliminated from the drive mechanism.

Means may be provided for manually rotating the pivot plate 67 and for positioning the pivot plate in any predetermined position. As illustrated, the pivot plate 67 is provided with a U-shaped opening 73 (Fig. 2) in the end of the plate opposite the mounting screw 68. A lever 74 is mounted on a shaft 75 by suitable means, such as a pin 76, and the shaft 75 is rotatably mounted in the main block 16. A circular cam 77 is eccentrically mounted on the end of the shaft 75 opposite the lever 74, and is positioned to engage the U-shaped groove 73 in the pivot plate 67. When the lever 74 is moved, the cam 77 will rotate correspondingly, and the engagement of the cam with the U-shaped groove 73 will produce a corresponding rotation of the pivot plate 67. Thus, the contact point of the spherical balls 65 with the flat surface 15 of the drive member will be moved toward or from the axis of rotation of the drive member in an arcuate path.

Stop means may be provided to limit the travel of the pivot plate 67 in one or both directions. As illustrated in Fig. 2, the stop means consist of screws 80 and 81 inserted into threaded openings 82 and 83 in the main block 16. The screw 80 may be positioned in the opening 82 so that when the pivot plate 67 is in contact with the screw 80 a particular coupling ratio exists between the driven member and the drive member. Similarly, the screw 81 may be positioned axially in the opening 83 so that a different particular coupling ratio exists when the pivot plate is against the screw 81. Any coupling ratio between those determined by the stop screws 80 and 81 may be obtained by suitably positioning the lever 74. If it is desired that one or more particular coupling ratios between those two ratios should be available, means may be provided to lock the lever 74 on positions intermediate the two extreme positions. Such means may consist of a set screw (not shown) mounted in a threaded opening in the lever so that the point of the set screw bears against the main block 16.

The graduations 27 of the knob 20 of the drive member may be numbered, for example, from zero to 100. In order for the drive member to be set at the zero mark or other predetermined position when the driven member is in a particular location, it is necessary that the drive member be rotatable when the driven member is fixed in position. This result is easily obtained in the present embodiment of the invention by manually holding the plate 35 of the driven member and manually rotating the drive member to the desired position. This slipping motion is possible because the moving elements of the drive mechanism are held in contact by the spring 71 and the pressure of this spring may be overcome without damaging any of the parts.

A desirable advantage of the present invention lies in the fact that the flat surface 15 and the flat surface 64 need not be parallel in order to achieve proper operation of the drive mechanism. This advantage may be attained by employing the construction illustrated in Fig. 7 wherein the vertical plate 36 may be tilted in a horizontal plane or a vertical plane or both with respect to the flat surface 15 of the drive member. This embodiment of the invention will be useful where the frame of the drive mechanism cannot be exactly aligned with the desired direction of translation of the driven member. Here the guide plate 42 is not attached to the main block by the spacer 43. A pair of brackets 91 is attached to the opposing ends of the main block 16 by suitable means, such as screws 92. Each bracket 91 is provided with a groove 93 and two flat shoulders 94. Pins 95 are provided on opposing ends of the guide plate 42 to engage the grooves 93 of the brackets. An opening 96 is provided in the end of each bracket opposite the end mounted to the main block 16. A spring 97 is positioned in this opening to bear against the pin 95, and the spring is retained in place by a screw 100, also inserted in the opening. The pressure of the springs 97 against the pins 95 urges the guide plate 42 into contact with the balls 52, 53 and 54. Four lugs 101 having tapped openings therein extend from the sides of the guide plate 42 adjacent the pins 95, two of the lugs being at each end of the guide plate. Four screws 102 are positioned in the threaded openings in the lugs 101 and bear against the flat shoulders 94. The angular relation between the guide plate 42 and the main block 16 is controlled and adjusted by the relative positions of the four screws 102. Since the direction of travel of the driven member is controlled by the position of the guide plate 42, the relative motion between the driven member and the main frame is controllable by suitable adjustment of the four screws 102. In this embodiment of the invention the distance between the flat surfaces 64 and 15 at the point of contact with the spherical balls 65 will vary depending upon the particular position of the balls and the driven member. However, this does not affect the operation of the invention, since the moving elements are kept in firm contact by the pressure of the spring 71.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a drive mechanism, the combination of: a translating member having a flat surface parallel to the plane of translation; a rotating member having a flat surface perpendicular to its axis of rotation; a bushing positioned between said translating member and said rotating member; spherical means located within said bushing and contacting said flat surfaces in power translating relationship; and means for compressing said bushing to reduce play between said bushing and said spherical means.

2. In a drive mechanism, the combination of: a frame; a drive member rotatably mounted on said frame; a driven member translatably mounted on said frame; spherical means positioned between said drive member and said driven member, said spherical means coupling said drive member and said driven member in power transmitting relationship; and resilient means normally urging one of said members toward the other of said members, said members being manually displaceable relative to each other.

3. In a drive mechanism, the combination of: a frame; a drive member rotatably mounted on said frame; a driven member translatably mounted on said frame; plate means pivotally mounted in said frame; spherical means positioned between said drive member and said driven member and mounted on said plate means at a point eccentric of the pivot axis of said plate means, said spherical means coupling said drive member and said driven member in power transmitting relationship, said translation of said driven member having a predetermined relation to said rotation of said drive member; and means for pivoting said plate means whereby said spherical means is moved in an arcuate path thereby changing said predetermined relation.

4. In a drive mechanism, the combination of: a translating member having a first flat surface parallel to the plane of translation; a rotating member having a second flat surface perpendicular to its axis of rotation, said flat surfaces being normally parallel, and said first flat surface being tiltable with respect to said second flat surface; spherical means positioned between said translating member and said rotating member and contacting said flat surfaces, said spherical means coupling said translating member and said rotating member in power transmitting relationship, the movement of said translating member and said rotating member having a predetermined relationship, said spherical means being movable to change said predetermined relationship; and spring means maintaining said spherical means in contact with said flat surfaces.

5. In a drive mechanism, the combination of: a frame, including a block having anti-friction means positioned thereon; a driven member mounted in said frame, said driven member including a plate having two opposing surfaces, the first of said opposing surfaces engaging said anti-friction means whereby said driven member is constrained to move in a straight path; a drive member rotatably mounted in said frame, said drive member having a flat surface perpendicular to its axis of rotation; a bushing movably positioned between said driven member and said drive member; ball means mounted in said bushing and contacting the second of said opposing surfaces and said flat surface in power transmitting relationship, the relation of the movement of said driven member to said drive member being controlled by the position of said bushing; means compressing said bushing, reducing play between said bushing and said ball means; and means urging said drive member toward said second opposing surface.

6. In a drive mechanism, the combination of: a frame; a block tiltably mounted on said frame, said block having anti-friction means positioned thereon; a driven member mounted on said anti-friction means and constrained to move in a straight path by said anti-friction means; a drive member rotatably mounted in said frame, said drive member having a flat surface perpendicular to its axis of rotation; ball means positioned between said driven member and said drive member and coupling said members in power transmitting relationship, the relative movement of said driven member and said drive member being controlled by the position of said ball means; and means urging said drive member toward said driven member, said drive member being manually rotatable when said driven member is constrained.

7. In a drive mechanism, the combination of: a frame including a block having anti-friction means positioned thereon; a driven member mounted by said frame, said driven member including a plate having two surfaces, the first of said surfaces engaging said anti-friction means whereby said driven member is constrained to move in a straight path; a drive member rotatably mounted in said frame, said drive member having a flat surface perpendicular to its axis; shifting means movably positioned between the second of said surfaces and said flat surface; ball means mounted in said shifting means and contacting said second surface and said flat surface in power transmitting relationship, the relation of the movement of said driven member to said drive member being controlled by the position of said shifting means; and means moving said shifting means in an arcuate path whereby the relative movement of said driven member to said drive member is changed.

8. In a drive mechanism, the combination of: a frame; a first plate tiltably mounted on said frame and having anti-friction means positioned thereon; a driven member including a second plate having two opposing surfaces, the first of said opposing surfaces engaging said anti-friction means whereby said driven member is constrained to move in a straight path; a drive member rotatably mounted in said frame, said drive member having a flat surface perpendicular to its axis of rotation; a bushing positioned between said driven member and said drive member; means for moving said bushing relative to said drive member and said driven member; ball means mounted in said bushing and contacting said flat surface and the second of said opposing surfaces in power transmitting relationship, the relation of the movement of said driven member to said drive member being controlled by the position of said bushing; means compressing said bushing minimizing play between said ball means and said bushing; and spring means urging said ball means into contact with said flat surface and said second opposing surface.

9. In a drive mechanism, the combination of: a frame; a translatable member mounted in said frame; a rotatable member mounted in said frame; carriage means pivotally mounted between said translatable member and said rotatable member; ball means mounted in said carriage means and coupling said translatable member to said rotatable member in power transmitting relationship; lever means mounted by said frame and coupled to said carriage means whereby said carriage means is pivoted to change the coupling between said translatable member and said rotatable member; and stop means limiting the travel of said carriage means and fixing said coupling at a first predetermined ratio when said carriage engages said stop means.

10. A mechanism as defined in claim 9, including lock means coacting with said lever means and said frame and locking said lever means at a predetermined point whereby said coupling ratio is fixed at a second predetermined ratio.

11. In a power transmission, the combination of: a frame, including a block with two parallel grooves; anti-friction means mounted in said parallel grooves; a driven member having means engaging said anti-friction means whereby said driven member is constrained to move in a straight line; a drive member rotatably mounted in said frame; a bushing positioned between said driven member and said drive member; carrier means for pivotally mounting said bushing on said frame; ball means mounted in said bushing and contacting said driven member and said drive member; spring means mounted intermediate said frame and said drive member, urging said drive member into contact with said ball means; screw means compressing said bushing into contact with said ball means; lever means pivotally mounted on said frame and engaging said carrier means whereby said bushing is moved with respect to said drive and driven members when said lever means is pivoted; and stop means limiting the travel of said bushing and fixing said bushing at a predetermined position between said drive and driven members.

12. In a drive mechanism, the combination of: a frame; a plate tiltably mounted on said frame, said plate having anti-friction means positioned thereon; a drive member having a flat surface perpendicular to its axis of rotation; a driven member mounted on said anti-friction means and constrained to move in a straight path by said anti-friction means, the plane of the motion of said driven member being variable with respect to said flat surface by adjustment of said tiltable plate; ball means positioned between said driven member and said drive member and coupling said members in power transmitting relationship, the relation of the movement of said driven member to said drive member being controlled by the position of said ball means; and means resiliently urging said drive member toward said driven member.

13. In a power transmission adapted to translate a probe element, the combination of: a frame; a drive member rotatably mounted to said frame, said drive member having a flat first surface normal to the axis of rotation; a driven member translatably mounted to said frame, said driven member having a substantially flat second surface normal to the axis of rotation of said drive member; guide means intermediate said frame and said driven member for limiting movement of said driven member along a predetermined path; resilient means normally urging said surfaces of said drive and driven members toward each other; movable means pivotally mounted to said frame; coupling means intermediate said first and second surfaces rigidly connected to said movable means, said coupling means being characterized by a bushing having a cylindrical bore therethrough, the axis of said bore being substantially parallel to the axis of rotation of said drive member, and at least two balls disposed within said bore in superimposed relationship, the outer of said superimposed balls respectively contacting said first and second surfaces; means for deforming said bushing to restrain lateral movement of said balls within said bushing; and displaceable cam means engaging said movable means for pivotal movement thereof to cause arcuate movement of said coupling means relative to said first surface, the relation of movement of said displaceable cam means to the arcuate movement of said coupling means being nonlinear.

References Cited in the file of this patent

UNITED STATES PATENTS

| | | |
|---|---|---|
| 1,415,164 | Ford | May 9, 1922 |
| 2,602,338 | Opecensky | July 8, 1952 |

FOREIGN PATENTS

| | | |
|---|---|---|
| 11,766 | Great Britain | Oct. 15, 1915 |